United States Patent

[11] 3,615,798

[72] Inventor Gene N. Woodruff
 Bartlesville, Okla.
[21] Appl. No. 760,706
[22] Filed Sept. 18, 1968
[45] Patented Oct. 26, 1971
[73] Assignee Phillips Petroleum Company

[54] ASPHALT EMULSIONS
 10 Claims, No Drawings
[52] U.S. Cl................................................. 106/277,
 106/15, 106/282, 117/138.8, 117/140, 117/161,
 117/168, 252/311.5, 260/28.5
[51] Int. Cl................................................... C08h13/00,
 C08k 17/02, C09d 17/11
[50] Field of Search.............................. 106/277–285,
 15 AF, 14; 252/311.5; 424/30, 300;
 260/28.5

[56] References Cited
 UNITED STATES PATENTS

| | | | |
|---|---|---|---|
| 2,330,747 | 9/1943 | Roediger.................... | 106/279 |
| 2,862,850 | 12/1958 | Goodhue.................... | 424/300 |
| 2,918,940 | 12/1959 | Carr........................... | 260/28.5 AS X |
| 3,236,671 | 2/1966 | Dybalski et al............. | 106/277 |
| 3,323,254 | 6/1967 | Gaj et al.................... | 260/28.5 AS X |
| 3,351,495 | 11/1967 | Larsen et al................ | 260/28.5 A |

*Primary Examiner*—Julius Frome
*Assistant Examiner*—Joan B. Evans
*Attorney*—Young and Quigg

ABSTRACT: Stable oil-in-water emulsions of N,N-dimethyl sulfenyl dithiocarbamates rodent repellents, with asphalt and polyolefins, are prepared using emulsifying agents selected from certain amphoteric, nonionic, and anionic emulsifiers, which emulsions can be readily applied to surfaces to render same rodent and roach repellent.

ASPHALT EMULSIONS

BACKGROUND OF THE INVENTION

The present invention relates to coating compositions and to their preparation. In accordance with another aspect, this invention relates to stable oil-in-water asphalt emulsions containing a rodent and roach repellent. In accordance with another aspect, this invention relates to stable oil-in-water polyolefin emulsions containing rodent and roach repellents. In accordance with a further aspect, this invention relates to stable oil-in-water emulsions of N,N-dimethyl sulfenyl dithiocarbamates with asphalt prepared with selected amphoteric, nonionic emulsifying agents. In accordance with a still further aspect, this invention relates to a fabric prepared from fibers of a polyolefin coated with an oil-in-water emulsion of the invention.

The problem of attack of growing trees and other nursery stock, as well as certain plants, by rodents, particularly rabbits, has become serious in many localities. In many instances the problem is also serious in buildings which are used for storage of various grain products. Any material which has a repellent action toward rodents, including rabbits, rats, etc., and which can be readily applied to surfaces to be protected would be highly useful and advantageous when applied to objects which are subject to attack by rodents.

In accordance with the invention, asphalt and polyolefin emulsions containing a rodent and roach repellent are provided, which emulsions are readily applied to surfaces for rodent and roach proofing various facilities utilizing these surfaces treated with emulsions of the invention.

Accordingly, an object of this invention is to provide stable oil-in-water emulsions of asphalt containing a rodent repellent.

A further object of this invention is to provide stable oil-in-water asphaltic emulsions.

A further object of this invention is to provide stable oil-in-water emulsions of polyethylene containing rodent repellent.

A further object of this invention is to provide stable asphalt emulsions containing rodent repellent in the form of an emulsion of rodent repellent and polyethylene.

A further object of this invention is to provide a cloth or mat of fibers of polyolefin coated with asphaltic and polyolefinic emulsions.

A still further object of this invention is to provide a novel oil-in-water asphalt-polyolefin emulsion blend.

Other aspects, objects and the several advantages of this invention will be readily apparent to those skilled in the art upon reference to the following description and appended claims.

SUMMARY OF THE INVENTION

According to the invention, a blend of N,N-dimethyl sulfenyl dithiocarbamate and an oil-in-water asphalt emulsion comprising asphalt, water and selected emulsifying agents are provided.

The asphalt emulsions can be amphoteric, anionic or nonionic, or mixtures thereof, and can be prepared by any method suitable and known to those skilled in the art.

Further, in accordance with the invention, it has been found that polyolefins, particularly polymers of mono-l-olefins having from 2 to 8 carbon atoms per molecule, preferably polymers of ethylene, or propylene, including both homopolymers and copolymers, after heating with rodent and roach repellent, can be emulsified by oleic acid and triethanolamine. The resulting composition of dithiocarbamate and polyolefin can be applied to surfaces for protecting same against attack by rodents and roaches.

In accordance with one embodiment of the invention, a cloth which is impervious to water is prepared from the fibers of a polyolefin coated or impregnated with an oil-in-water emulsion prepared from asphalt, water and selected emulsifying agents and oil-in-water emulsions prepared from polyolefin, water, and selected emulsifying agents and an N,N-dimethyl sulfenyl dithiocarbanate, a rodent and roach repellent.

In accordance with a further embodiment of the invention, stable oil-in-water emulsions comprising (a) an N,N-dimethyl sulfenyl dithiocarbamate; (b) asphalt and at least one emulsifying agent selected from (1) amphoteric betaine derivatives, (2) nonionic compounds containing 20–60ethylene oxide groups, and (3) anionic compounds; and (c) a polyolefin, are prepared, which emulsions can be applied to surfaces desired to be rendered rodent and roach repellent.

In accordance with another embodiment of the invention, the N,N-dimethyl sulfenyl dithiocarbamate is incorporated into the asphalt emulsion by emulsifying the dithiocarbamate with a polyolefin prior to blending with the asphalt emulsion. The resulting emulsions are excellent rodent repellent compositions.

DESCRIPTION OF PREFERRED EMBODIMENTS

Specific N,N-dimethyl sulfenyl dithiocarbamate compounds applicable to the present invention are N,N-dimethyl-S-methyl sulfenyl dithiocarbamate and N,N-dimethyl-S-tert butyl sulfenyl dithiocarbamate.

The dithiocarbamate compounds of the invention can be prepared by any convenient method. One method for the preparation of said compounds comprises reacting an alkali metal salt of an N-substituted dithiocarbamate with an aliphatic sulfenyl thiocyanate. Further details regarding preparation of the dithiocarbamate compounds can be found in U. S. Pat. No. 2,390,713 and U. S. Pat. No. 2,862,850.

The amount of dithiocarbamate present in the emulsions of the invention set forth in more detail hereinbelow range from 0.5 weight percent to 20 weight percent preferably 1 to 10 weight percent.

The asphalts used in the preparation of the emulsion include any of those bituminous materials used heretofore and known in the prior art, such as natural asphalts or those derived from petroleum refining, for example, by steam refining and/or air blowing, and the like. Asphalts characterized by penetrations (ASTM D–5–51) from 0 to about 300, or even higher, and preferably from about 40 to 300 and having softening points (ASTM D–36–26) in the range of 90° to 250° F., and preferably 100° to 150° F., represent suitable asphalts that can be employed.

The relative amounts of the various components of the asphalt emulsions can vary, but in general the asphalt is present in an amount in the range of 50 to 90, preferably 60 to 85 weight percent; the emulsifier is present in an amount in the range of 0.1 to 4, preferably 0.25 to 1, and water is present in an amount between 50 and 10 weight percent based on the total blend.

The asphalt emulsions employed can be prepared by any method known to those skilled in the art, for example, by preparing a soap solution comprising water, either soft or hard, and an emulsifying agent, either amphoteric, anionic or non-ionic. The soap solution is then mixed in a colloid mill or the like with the asphalt phase, the latter being preferably heated to reduce the viscosity. Usually, the emulsifiers and any modifiers or promoters are dispersed in the water to form a soap solution which is then warmed to a temperature of 90° F. to 200° F., preferably 90° F. to 125° F. The asphalt can be heated heated to a temperature in the range of 150° F. to 350° F., preferably 250° F. to 300° F. The warm soap solution and hot asphalt are then proportioned to a colloid mill to emulsify the mixture, during which milling the temperature of the mixture can be in the range of 100° F. to 210° F., preferably 150° F., preferably 150° F. to 200° F. The completed emulsion is then cooled to a temperature below 150° F. before being used or transferred to storage. The method of preparing an emulsion will have some effect on the properties thereof and the intended application or utility of the emulsion will dictate which particular method one should use to get the desired properties.

Further, in accordance with the invention, it has been found that polyolefins, particularly polymers of mono-l-olefins having from 2 to 8 carbon atoms per molecule, preferably polymers of ethylene or propylene, including both homopolymers and copolymers can be mixed with an asphalt emulsion such as hereinbefore described. It has been further found that the dithiocarbamates described above can be effectively incorporated into the asphalt emulsion by emulsifying the dithiocarbamate with a polyolefin such as polyethylene and/or polypropylene. The resulting compositions containing dithiocarbamate, polyolefin and asphalt have been found to be excellent rodent repellent compositions which can be readily applied to surfaces for protecting same against attack by rodents.

In addition, the emulsions, both asphalt and polyolefin, or blends of asphalt and polyolefin emulsions of the invention can be applied to a cloth or mat made from fibers, for example, fibers formed from synthetic thermoplastics, that have been previously woven or matted into a cloth or structure resembling same to form a waterproof structure. The water in the emulsion can be removed by any suitable method such as air drying or drying in an oven or by other heat.

It is also within the scope of the invention to add short fiber asbestos and similar materials to the emulsions of the invention. The addition of short fiber asbestos, for example, to the emulsions of the invention increases the usefulness of the emulsions, increases the viscosity and permits application of the emulsions to surfaces where improved adhesion is necessary. The ring and ball properties of the dried product is greatly increased by the addition of asbestos.

The amount of polyolefin added to the emulsions of the invention can vary appreciably, but will generally be in the range of 1 to 20 weight percent. Similarly, the amount of asbestos added can be varied depending on the resulting desired characteristics, but in general will be in the range of 1 to 10 weight percent. The asbestos fibers are finely divided and ordinarily 0.1 mm. to 2.0 mm. in length.

As indicated above, the emulsions of the invention are particularly effective as coating or impregnating compositions to be utilized in places where it is desired to protect surfaces against attack by rodents. However, if desired, the compositions of the invention can be used for other applications, including waterproofing material for rooves and the like, for covering spaced-in surfaces in irrigation canals, ponds, open dams, and the like, and for related uses. The impregnated cloth or matting can be used for either temporary or permanent roofing, for mulching, for tenting material, and for related uses.

As indicated previously, the emulsifying agents employed to prepare the asphalt emulsion of the invention can be amphoteric, anionic or non-ionic, or combinations thereof.

A particularly useful class of amphoteric emulsifying agents are the betaine derivatives such as coco betaine (Culveram CDG) and cetyl betaine (BCO), as well as other coco- and tallow-derived glycine compounds, stearyl ammonium sulfonic acid betaine, and myristyl ammonium sulfonic acid betaine.

The nonionic emulsifying agents found effective are those containing 20 to 60 ethylene oxide groups, for example, Triton X-305 and Triton X-405.

The anionic emulsifying agents found effective include Vinsol resin with or without Indulin C, as well as sodium salts of stearic acid, oleic acid, linoleic acid, saturated acids, tall oil derived anionic emulsifiers, and the like.

As is demonstrated by the working examples hereinbelow, cationic emulsifiers are ineffective for producing stable oil-in-water emulsions according to the invention.

Additional suitable nonionic emulsification agents include those of the general formula:

$$R-O-(C_2H_4O)_x-\left(\begin{array}{c}CH-CH_2-O\\|\\CH_3\end{array}\right)_y-(C_2H_4O)_z-H$$

where R is selected from the group consisting of hydrogen, aryl, and alkylaryl radicals; and $x$, $y$ and $z$ are integers, such that (1) when $x$ is O, $y$ is also O, $z$ is in the range of 6 to 11, inclusive, and said R is one of said aryl and alkylaryl radicals, and (2) when $x$ and $y$ are each greater than O, the sum of $x$ and $z$ is in the range of 20 to 40, inclusive, and $y$ is in the range of 40 to 60, inclusive.

Representative examples of the nonionic emulsifying agents include: phenoxypenta(ethyleneoxy)ethanol, phenoxyocta(ethyleneoxy)ethanol, phenoxyennea(ethyleneoxy)ethanol, phenoxydeca(ethyleneoxy)ethanol, 4-methylphenoxypenta(ethyleneoxy)ethanol, 2,3,6-triethylphenoxyhepta(ethyleneoxy)ethanol, 4(1,1,3,3-tetramethylbutyl)phenoxyhepta(ethyleneoxy)ethanol, 4(1,3,5-trimethylhexyl)phenoxyhexa(ethyleneoxy)ethanol, 4-nonylphenoxyhepta(ethyleneoxy)ethanol, 2,3,4,5,6-penta-n-pentylphenoxyennea(ethyleneoxy)ethanol, 2(1,3,5-trimethylhexyl)-4(1,3-dimethylbutyl)phenoxypenta(ethyleneoxy)ethanol, 4(3,5,5-trimethylheptyl)phenoxyhexa(ethyleneoxy)ethanol, 3(3,5,7,7-trimethyl-5-ethylnonyl)phenoxyhepta(ethyleneoxy)ethanol, 4(1,1,3,3,5,5,7,7-octamethyldecyl)phenoxyennea(ethyleneoxy)ethanol, 4-n-pentacosylphenoxypenta(ethyleneoxy)ethanol, 3,5-di-n-decyl-4-n-pentylphenoxydeca(ethyleneoxy)ethanol, beta-hydroxyethyleneoxytetraconta-(propyleneoxy)octadeca(ethyleneoxy)ethanol, beta-hydroxyethoxyoctadeca(ethyleneoxy)tetracontra(propyleneoxy)ethanol, beta-hydroxyethoxynonadeca(ethyleneoxy)hexaconta(propyleneoxy)deca(ethyleneoxy)ethanol, beta-hydroxyethoxynonadeca(ethyleneoxy)hexaconta(propyleneoxy)nonadeca(ethyleneoxy)ethanol, beta-hydroxyethoxytetradeca(ethyleneoxy)pentatetraconta(propyleneoxy)tetradeca(ethylenoxy)ethanol, phenoxyethyleneoxypentapentaconta(propyleneoxy)octatriaconta(ethyleneoxy)ethanol, 4-methylphenoxydeca(ethyleneoxy)nonatetraconta(propyleneoxy)eicosa(ethyleneoxy)-ethanol, 4(1,3,5-trimethylhexyl)phenoxyhexa(ethyleneoxy)pentacontra(propyleneoxy)triconta(ethyleneoxy)ethanol, 4-n-pentacosylphenoxypentacosa(ethyleneoxy)-pentaconta(propyleneoxy)deca(ethyleneoxy)ethanol, 2,4,5-trimethylphenoxydeca-(ethyleneoxy)pentaconta(propyleneoxy)pentacosa(ethyleneoxy)ethanol, 2(1,3,5-trimethylhexyl)-4(1,1,3,3-tetramethylbutyl)-phenoxyeicosa(ethyleneoxy)hexatetraconta(propyleneoxy)penta(ethyleneoxy)ethanol, 4-n-pentacosylphenoxyeicosa(ethyleneoxy)hexaconta(propyleneoxy)nonatriaconta(ethyleneoxy)ethanol, and the like, and mixtures thereof.

In addition, other nonionic emulsifying agents may be used including those of the general formula:

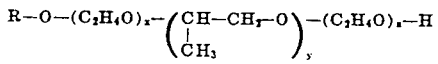

where R is selected from the group consisting of hydrogen, aryl and alkaryl radicals; and $x$, $y$, and $z$ are integers such that (1) when $x$ is O, $y$ is also O, $z$ is in the range of 20 to 60, and R is one of said aryl and alkaryl radicals, and (2) when $x$ and $y$ are each greater than O, the sum of $x$ and $z$ is in the range of 50 to 350, and $y$ is in the range of 40 to 60.

The nonionic emulsifying agents, so as shown by the general formula, represent a rather narrow class of compounds and they have a critical balance of hydrophobic component (the R and propyleneoxy groups) and hydrophilic component (ethyleneoxy groups) necessary to give the necessary mixing time. Within the general formula given earlier for these nonionic emulsifying agents, there are two preferred subclasses that can be represented by the following general formulas:

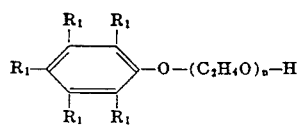

where R is selected from the group consisting of hydrogen and alkyl radicals having 1 to 25 carbon atoms, the total number of M atoms in the alkyl radicals preferably does not exceed 25, and n is an integer in the range of 20 to 60; and

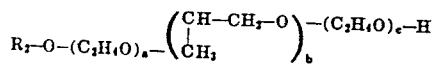

where a and c are integers greater than O and whose sum is in the range of 50 to 350, b is an integer in the range of 40 to 60, and $R_2$ is selected from the group consisting of hydrogen and the hydrocarbon radical:

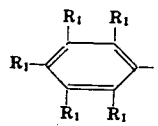

where $R_1$ is as defined above.

A particularly preferred nonionic emulsifier is Triton X-305, which is a mixture of octaphenoxypoly(ethyleneoxy)ethanol having 30 ethyleneoxy groups in the poly(ethyleneoxy) chain.

Suitable anionic emulsifying agents employed include the sulfonates, particularly the alkylaryl sulfonates, such as: p-dodecylbenzene sodium sulfate, n- or iso-p-octylphenoxypoly(ethyleneoxy)ethanol sodium sulfonates, sodium isopropylnaphthalene sulfonate, sodium tetrahydronaphthalene sulfonate and methylnaphthylene sodium sulfonate (Petro Ag); and the sulfates: sodium cetyl sulfate (n-hexadecylsodium sulfate), ammonium lauryl sulfate, sodium tridecyl sulfate; and the phosphates: alkylpolyphosphates, complex amido-phospho salts, as well as esters and others such as: sodium diamyl sulfosuccinate and disodium-N-octadecyl sulfosuccinamate.

Although not essential, other materials can be employed in the asphalt emulsion, including such stabilizing agents as hydroxyethylcellulose, aluminum chloride, and calcium chloride.

EXAMPLE I

A run was carried out to demonstrate the ineffectiveness of cationic emulsifying agents in emulsifying a mixture of a dithiocarbamate and asphalt.

In the run, 2,373 grams of an asphalt consisting of a 50—50 blend of two asphalts derived from different sources but having an 86 penetration and 115° F. R and B was heated to 285° F. To the above asphalt was added 125 grams of tert-butylsulfenyldimethyl dithiocarbamate and stirred until a smooth blend resulted.

A solution of 2,900 grams water, 45 grams Nalco TX 22–66, and 45 grams Nalco TX 26–66, and 45 grams concentrated HCL (pH of solution was 1.0) was charged to a colloid mill together with the asphalt-dithiocarbamate blend obtained above. The mixture failed to emulsify.

EXAMPLE II

The blend of asphalt and dithiocarbamate obtained in example I was charged to the colloid mill with a solution (pH of 7) of 2,900 grams water and 90 Culveram CDG, an amphoteric emulsifying agent containing both carbonyl and amino groups. A stable emulsion resulted.

EXAMPLE III

Another run was carried out wherein an anionic emulsifying agent was utilized to form the asphalt emulsion.

In this run 2,452 grams of an 85/100 asphalt was blended with 129 grams of tert-butylsulfenyldimethyl dithiocarbamate at a temperature of 285° F. The temperature was then lowered to about 260° F. The asphalt was charged to a colloid mill. An aqueous solution of 3,000 grams water, 8.6 grams NaOH, 78 grams Vinsol resin, and 24 grams Indulin C, at a pH of 11, was charged to the mill. A stable emulsion was formed. The milling temperature was about 175° F. and the milling pressure was 30 p.s.i.g.

The product emulsion contained 64.8 percent residue asphalt upon evaporation. The emulsion was anionic.

EXAMPLE IV

A run was carried out in which a nonionic emulsion with the asphalt was formed.

In this run, 129 grams of tert-butylsulfenyldimethyl dithiocarbamate was blended in 2,442 grams of an 85/100 asphalt at about 275° F. A solution of 75 grams Triton X-305 in 2,900 grams water with 1 gram concentrated HCl (pH of aqueous solution was 5.6) was charged to a colloid mill along with the dithiocarbamate-asphalt blend. A stable emulsion containing 62.8 percent asphalt was produced at a milling temperature of 180° F.–185° F. and 30 p.s.i.g. The resulting emulsion was nonionic.

EXAMPLE V

A run was carried out which additionally contained asbestos fibers to increase the viscosity and usefulness of the resulting emulsion.

In this run, 117 grams of an asphalt emulsion produced according to example III was blended with 4.1 grams Johns Manville asbestos 7M02 and 4 grams of water. A smooth pourable emulsion resulted which when dried by heating to about 300° F. has had a ring and ball of 205° F., compared with 108° F. for the emulsion without the asbestos.

EXAMPLE VI

In another run, 139.5 grams asphalt emulsion produced as in example IV which contained tert-butylsulfenyldimethyl dithiocarbamate was blended with 4.9 grams asbestos 702 and 5 grams of water. A fluid emulsion resulted which when dried by heating to about 300° F. had a ring and ball of 163° F., compared with 110° F. for the emulsion without the asbestos.

The asbestos offers greater resistance to a rodent and permits thicker applications on sloping surfaces.

EXAMPLE VII

Additional runs were carried out in which the tert-butylsulfenyldimethyl dithiocarbamate was emulsified with polyethylene and subsequently blended with an asphalt emulsion.

In one run, 7 grams of tert-butylsulfenyldimethyl dithiocarbamate, 38 grams of polyethylene, 8.6 grams oleic acid, and 6.7 grams of triethanol amine were melted together at a temperature of 270° F. and were poured slowly into 302 grams of water at a temperature of 200° F. with constant stirring by a dispersator at a high speed. The stable polyethylene emulsion thus formed can be used as such as rodent repellent or roach repellent. If desired, the substrate can be applied to a substrate such as polyolefin fabric. The polyethylene emulsion is colorless and will stick to solid surfaces and fabrics.

In another run, the resulting stable polyethylene emulsion was blended in an amount of 10 grams with 12 grams of an asphalt emulsion using cetyl betaine as the emulsifying agent. The resulting blend produced upon drying a product containing 2 percent tert-butylsufenyldimethyl dithiocarbamate, 82 percent asphalt, and 11.3 percent polyethylene.

The emulsion blend produced above containing the polyethylene, asphalt and dithiocarbamate has also been found to be rodent repellent.

As indicated previously, the emulsions of the invention can be applied to fabrics or clothlike materials formed from polyolefins. Thus, the dithiocarbamate-polyethylene emulsion or dithiocarbamate-asphalt-polyethylene emulsion obtained above can be applied to, say, polypropylene cloth to prevent rodent damage in large grain storage bins in countries short of food. In some instances, it may be desirable also to add a thin layer of the dithiocarbamate-polyethylene emulsion to asphalt-polypropylene cloth bins already constructed.

Cockroaches, water bugs and other small insects tend to gather and live where moist conditions prevail. Asphalt and polyethylene emulsions containing dithiocarbamates prevent cockroaches from occupying these moist areas when the surfaces are sprayed with the dithiocarbamate emulsions. Painting or spraying the boards on the under side of the frame house discourages the presence of insects. The foundations can be made repugnant to insects by a coating of the dithocarbamates-containing emulsions. Cracks in the foundation, in walls, between wood or between concrete and wood can be sealed and insect growth eliminated by the dithiocarbamate emulsions. Growth of insects in storage areas of ships can be controlled by the use of dithiocarbamate emulsions at cracks and corners, on beams, between flooring and in every crack and crannie of the vessel where insects thrive. The cost of fumigation would be saved and the life of wooded timbers increased.

Painting or spraying the ground around the house prevents the passage of cockroaches and small insects such as termites. Treatment of all wood in, on or near the ground prevents termite attack on the wood. Asphalt and polyethylene emulsions containing dithiocarbamates adhere well to all solids and this case there is no danger of food contamination since the dithiocarbamate is an integral part of the plastic or asphalt.

EXAMPLE VIII

Asphalt emulsions containing varying amounts of repellent and polyethylene emulsions containing roach repellent, along with asphalt and polyethylene emulsions containing no repellent as control runs, were evaluated for cockroach repellency. The method of determining cockroach repellency is the corner card method. (The corner card is used to determine the potential repellency of materials treated with the indicated candidate chemical.)

The method is based upon the tendency of cockroaches to congregate in and climb on corner surfaces. The test cards at the dosages and the untreated control card are placed upright in corner position against the inside wall of a glass box containing German cockroaches (Blattella germanica). Food and water are placed in the center of the box, and feeding is permitted ad lib. At hourly intervals a number count is made of the cockroaches present on each of the cards, as given in table I.

TABLE 1.—COCKROACH REPELLING TEST

| | Hours | | | | | | | | | Total count of all readings | Average count per reading | Average, expressed as percent of control |
|---|---|---|---|---|---|---|---|---|---|---|---|---|
| | 1 | 2 | 3 | 4 | 5 | 6 | 7 | 8 | 9 | | | |
| 5.0% R55 (dry basis) asphalt emulsion | 3 | 1 | 1 | 0 | 1 | 0 | 0 | 0 | 2 | 8 | 0.9 | 3.1 |
| 0.85% R55 (dry basis) asphalt emulsion | 8 | 4 | 3 | 3 | 3 | 3 | 3 | 6 | 6 | 39 | 4.3 | 14.8 |
| Zero R55 (Control) asphalt emulsion | 20 | 24 | 16 | 12 | 15 | 12 | 29 | 64 | 69 | 161 | 29.0 | 100.0 |
| 11.6% R55 (dry basis) polyethylene emulsion | 1 | 2 | 3 | 2 | 4 | 2 | 3 | 2 | 1 | 20 | 2.2 | 4.6 |
| Zero R55 (Control) polyethylene emulsion | 47 | 39 | 47 | 54 | 65 | 49 | 51 | 37 | 42 | 431 | 47.9 | 100.0 |

NOTE: R55=tert-butylsulfenyldimethyl dithiocarbamate.

have a long life since the life of the dithiocarbamates is the life of the polyethylene or asphalt itself. Any particle of asphalt or polyethylene is effective because the dithiocarbamates are intimately blended with the carrier asphalt or polyethylene. At times it is desirable to prevent insect growth in a bulk area such as post holes, reservoirs, pits and depressions. Dithiocarbamate emulsions can be used to coat sand or gravel, which as a filler for the hole or pit, would not only prevent insect growth but would seal the entire area watertight. In such use the sand, gravel, or even dirt itself, can be pretreated, dried, and tamped in place. The life of telephone poles, and posts is increased by filling the hole with pretreated sand, dirt or gravel treated by the dithiocarbamate-asphalt or polyethylene emulsions and dried. The presence of insects in bomb shelters and fallout shelters is effectively discouraged by treating corners, moist areas, beams, cracks, and storage area with the dithiocarbamate emulsions.

It is desirable to maintain poultry houses free of cockroaches, especially in damp corners or storage areas. Treatment of the corners, cracks, foundation (and its juncture with the wooden beams) will discourage or eliminate cockroaches.

The kennels of pets and the working areas of veterinary hospitals are must freer of small insects when the corners and moist areas are treated by asphalt or polyethylene-dithiocarbamate emulsions. A thin layer of the dithiocarbamate emulsions reduces the small insects in garbage pails. Use of the emulsions in the corners of hog sheds and pig troughs helps maintain cleanliness by cutting down the cockroach population. The absence of small insects also helps to prevent disease in the animals.

Treatment of the corners and inaccessible areas of restaurants and grocery stores helps to keep the premises free of cockroaches, which is most essential where food is handled. In

EXAMPLE IX

Three samples were submitted for roach repellency studies. These were an asphalt emulsion plus 1.0 percent and 0.67 percent repellent and an asphalt emulsion without repellent applied to polypropylene fabric.

Roaches are raised, for this particular purpose, in a glasslike enclosure comparable to a fish tank. It is approximately 1 foot in width, 2 feet in length and approximately 10 to 12 inches deep. The test panels or test materials are placed in a perpendicular or upright position in the corners of the container as it has been noted that the German cockroach apparently favors these corners in walking up to the upper level or top of the container. The test pieces or samples are affixed to the glass container on the inside by masking tape in a strip about 1 to 2 inches wide on each of the corners is placed into position and 10 individual replicated tests are conducted. There are probably something on the order of 3 to 4 hundred cockroaches per container and at random intervals the number of roaches on the test panels, as well as the check, are recorded.

Data on these test materials are given in the following table.

TABLE 2.—COCKROACH REPELLENCY TEST

| Emulsion chemical | R55 Dose, percent | REP 1 | REP 2 | REP 3 | REP 4 | REP 5 | REP 6 | REP 7 | REP 8 | REP 9 | REP 10 |
|---|---|---|---|---|---|---|---|---|---|---|---|
| Asphalt plus R55 | 1.0 | 0 | 1 | 2 | 7 | 5 | 2 | 0 | 3 | 0 | 0 |
| Do | 0.67 | 9 | 7 | 9 | 14 | 6 | 2 | 3 | 12 | 2 | 9 |
| Asphalt (Control) | 0.00 | 18 | 14 | 15 | 19 | 27 | 26 | 24 | 43 | 24 | 41 |

As will be noted from the above data by far the highest population count always occurred on the control or untreated area of the container. Dithiocarbamate at 1 percent dosage level had a very definite effect in repelling the roaches as is very evident from the above table. However, any reduction in dosage below the 1 percent level, as an example the 0.67 percent dosage had a marked reduction in repellency activity again as evidenced by the above data.

EXAMPLE X

The same materials used in the cockroach repellency test in example IX were also evaluated for the repellency using white rats. Again the test was conducted in small animal cages although this time the individual test units were separated by a minimum of two feet distance with a test panel being inserted on each side of the caged rat. The rats were, of course, provided with water but no food. The food was in a container on the outside of the containing cage so that they would have to chew through the repellency material before getting to such a food source. The results of this test are given in the following table.

TABLE 3.—WHITE RAT REPELLENCY TEST

| Emulsion | Dithiocarbamate (R55) | | REP 1 | REP 2 | REP 3 | REP 4 | REP 5 | REP 6 | REP 7 | REP 8 | REP 9 | REP 10 |
|---|---|---|---|---|---|---|---|---|---|---|---|---|
| Asphalt | 1% | Chewing food | 2 | 1 | 0 | 9 | 8 | 0 | 0 | 8 | 8 | 7 |
| | | | 0 | 0 | 0 | 1 | 2 | 0 | 0 | 6 | 7 | 5 |
| Asphalt (Control) | | do | 1 | 0 | 0 | *10 | *10 | *10 | *10 | *9 | *10 | *9 |
| | | | 0 | 0 | 0 | 8 | 8 | 10 | 10 | 8 | 6 | 5 |
| Asphalt | 0.67% | do | 0 | 0 | 0 | 0 | 0 | *8 | *8 | 7 | 8 | 7 |
| | | | 0 | 0 | 0 | 0 | 0 | 7 | 7 | 6 | *5 | *7 |

*Rats nesting in treated side.

Again it will be noted from the above data that the tests were conducted on 10 different dates which constitute replicates and that there definitely did appear to be repellency present when using the R55 at a 1 percent dosage level. Also, it will be noted that R55 at 0.67 percent gave excellent repellency up to the fifth day or the fifth replicate after which time chewing of the treated material occurred as well as feeding. It almost appears as though the white rat adapts itself to the odor or to the potential taste of this R55 for a period of time depending upon the dosage of the R55 in the particular sample material. The thing to note is the extensive chewing and feeding that occurred in all of the replicates in the case of the control. It should be noted that a rating of 10 for chewing indicates 100 percent chewing and a rating system of 10 for the food indicates 100 percent food consumption of that provided to the rats.

As pointed out earlier the test work with these white rats was conducted with a three-sectional cage with the rats being confined in the central portion and the challenge materials on each side of the cage using a control or untreated panel on one side and a treated panel on the other side. Upon chewing through the control or treated materials, the rats then entered a side cage where the food was provided. A record was also made of whether or not the rats would continue to inhabit the secondary portion of these cages and whether this side was adjacent to the treated or the untreated materials. This is indicated by the asterisks in the table above. Thus, the rats had access to food on either side of the test cage.

I claim:

1. A stable oil-in-water emulsion blend consisting essentially of:
   a. 0.5 to 20 weight percent of an N,N-dimethyl sulfenyl dithiocarbamate compound selected from the group consisting of N,N-dimethyl-S-methyl sulfenyl dithiocarbamate and sulfenyl dithiocarbamate,
   b. 50 to 90 percent asphalt,
   c. 0.1 to 4 weight percent of an emulsifying agent selected from the group consisting of
      1. amphoteric betaine derivatives,
      2. nonionic compounds containing 20–60 ethylene oxide groups, and
      3. anionic compounds, and
   d. 50 to 10 weight percent water based on the total blend.

2. A composition according to claim 1 which additionally contains a polyolefin, the total amount of said polyolefin in the total blend being in the range 1 to 10 weight percent.

3. A composition according to claim 1 wherein the amount of (a) is in the range 1 to 10 weight percent.

4. A composition according to claim 1 wherein said dithiocarbamate is N,N-dimethyl-S-tert butyl sulfenyl dithiocarbamate.

5. A composition according to claim 1 wherein the amphoteric emulsifying agent is coco betaine or cetyl betaine, and the nonionic emulsifying agent is octaphenoxypoly (ethyleneoxy)ethanol.

6. A composition according to claim 1 which additionally contains 1 to 10 weight percent asbestos fibers to increase the viscosity of the emulsion.

7. A product comprising a cloth impervious to water formed from fibers of a polymer of a mono-1-olefin having from 2 to 8 carbon atoms per molecule coated with an oil-in-water emulsion consisting essentially of:
   a. 0.5 to 20 weight percent of an N,N-dimethyl sulfenyl dithiocarbamate compound selected from the group consisting of N,N-dimethyl-S-methyl sulfenyl dithiocarbamate and N,N-dimethyl-S-tert butyl sulfenyl dithiocarbamate,
   b. 50 to 90 weight percent asphalt,
   c. 0.1 to 4 weight percent of an emulsifying agent selected from the group consisting of
      1. amphoteric betaine derivatives,
      2. nonionic compounds containing 20–60 ethylene oxide groups, and
      3. anionic compounds, and
   d. 50 to 10 weight percent water based on the total blend.

8. A cloth impervious to water according to claim 7 wherein said fibers are polypropylene.

9. A product according to claim 7 wherein said N,N-dimethyl sulfenyl dithiocarbamate compound is N,N-dimethyl-S-tert butyl sulfenyl dithiocarbamate.

10. A product according to claim 7 which additionally contains a polyolefin, the total amount of said polyolefin in the total blend being in the range 1 to 10 weight percent.